United States Patent [19]

McVicar et al.

[11] Patent Number: 4,763,744
[45] Date of Patent: Aug. 16, 1988

[54] POWER TAKEOFF SHAFT ARRANGEMENT FOR A ROAD VEHICLE

[76] Inventors: John A. McVicar, Box 26, Arnaud, Manitoba, Canada, R0A 0B0; Cameron C. McVicar, 1-611 St. Annes Road, Winnipeg, Manitoba, Canada, R2M 5K3

[21] Appl. No.: 35
[22] Filed: Jan. 2, 1987
[51] Int. Cl.⁴ .................................................. B60K 25/00
[52] U.S. Cl. ..................................... 180/53.7; 37/248
[58] Field of Search ................ 180/53.7; 37/248, 252, 37/256

[56] References Cited

U.S. PATENT DOCUMENTS

| | | | |
|---|---|---|---|
| 2,024,551 | 12/1935 | Thornhill | 37/256 |
| 2,283,101 | 5/1942 | Snook | 37/248 |
| 2,518,622 | 8/1950 | Ingersoll | 37/248 |
| 2,815,590 | 12/1957 | Fiacco | 37/248 |
| 3,055,127 | 9/1962 | Williamson | 37/252 |
| 3,483,938 | 12/1969 | Enters | 180/53.7 |
| 3,759,340 | 9/1973 | Schilter | 180/53.7 |
| 4,549,365 | 10/1985 | Johnson | 37/251 |
| 4,632,200 | 12/1986 | Doyen et al. | 180/53.7 |
| 4,633,961 | 1/1987 | Niskanen | 180/53.7 |

Primary Examiner—Richard A. Bertsch
Attorney, Agent, or Firm—Adrian D. Battison; Stanley G. Ade

[57] ABSTRACT

A power takeoff attachment for a conventional road vehicle includes a plate member with a rod extending transversely thereto and of a length so that the outer end thereof can be inserted into a V-shaped space between the torsion bar bracket and the frame of the vehicle. A rear edge of the plate can be bolted to the transverse beam of the frame of the vehicle with the angle of the plate being adjusted by the bolted connection. The plate carries a pair of bearing blocks which support the power takeoff shaft. Drive is communicated to the shaft via chain or belt coupling from a sprocket mounted at the pulley of the vehicle engine and attached to the pulley by bolts which pass into the pulley and into the crank shaft. The power takeoff shaft is exposed at a front end of the vehicle and can be used to drive an implement for example a snowblower or pump mounted on sleeve-shaped brackets carried on an underside of the vehicle frame.

19 Claims, 6 Drawing Sheets

4,763,744

POWER TAKEOFF SHAFT ARRANGEMENT FOR A ROAD VEHICLE

BACKGROUND OF THE INVENTION

This invention relates to a kit of parts which can be attached to a conventional automobile or road vehicle to provide a power takeoff shaft at a front end of a vehicle for driving an attached implement such as a snowblower or pump.

Road vehicles and particularly automobiles or pickup trucks are used every day by drivers for transportation of passengers or goods. Generally such vehicles include an engine at a front end of the vehicle with a suitable transmission for driving the wheels from the engine. In most cases the engine has significant excess power which is available particularly at low speeds of the vehicle. The present inventor has realized that this power is available to drive implements which can be attached to a front end of the vehicle.

A search has been carried out which has revealed U.S. Pat. Nos. 4,649,365, 2,815,590, 2,024,551, 3,759,340, 2,518,622, 3,055,127, 2,283,101.

Attention is particularly drawn to the above U.S. Pat. Nos. 2,024,551 (Thornhill), 2,283,101 (Snook), 2,815,590 (Fiacco) and 3,055,127 (Williamson) each of these shows a snowblower-type arrangement mounted on the front of a conventional motor vehicle and each mentions that a snowblower is driven by a power takeoff extending forwardly from the vehicle. None of the patents have explained exactly how the power takeoff is mounted or driven and the patents all concentrate on the details of the snowblower or its mounting.

In addition power takeoff drives are well known in various locations on tractors but these are generally provided as a fixed part of the original equipment in a manner which is not suitable for a conventional road vehicle.

It is one object of the present invention, therefore, to provide a kit of parts which can be attached to a conventional road vehicle to provide a power takeoff shaft having an end accessible at a front of the vehicle for driving an attached implement such as a snowblower or the like.

According to the invention, therefore, there is provided a motor vehicle of the type including a vehicle body having chassis frame members, ground wheels attached to the body for supporting the body in movement across the ground, an engine mounted in the body adjacent a front end thereof, transmission means for communicating drive from the engine to the wheels, a pulley mounted on a forward end of the engine for communicating drive via at least one belt from a crank shaft of the engine to at least one engine accessory, an improvement by the provision of a kit of parts comprising a base plate member having means thereon for releasible attachment of the base plate member to the frame members of the vehicle body, bearing means mounted on the base plate member, power takeoff shaft means carried in said bearing means and arranged relative to said plate member so as to extend, with the plate member attached to the frame members, parallel to and beneath the crank shaft and arranged such that a forward end thereof extends to an accessible position at a front of the vehicle body and drive coupling means for communicating drive from the crank shaft to the power takeoff shaft means including a flexible loop coupling member, a first drive member attached to the crank shaft at the pulley for driving the coupling member and a second drive member mounted on the power takeoff shaft for communicating drive from the coupling member to the shaft.

Preferably the plate member includes a rod which extends transversely to the plate member and which provides respective ends which can engage into a V-shape area which is the clamp for the torsion bar of the vehicle with the bar being pressed into the V-shape by engagement of one end of the plate member with a transverse beam of the vehicle frame. A coupling between the plate member and the transverse beam can be used to adjust the angle of the plate by pivotal movement about the ends of the rod so that the plate can be properly aligned to position the shaft at the required angle and also to tension and release the flexible loop coupling which may be a chain or belt.

According to a second aspect of the invention there is provided a motor vehicle of the type including a vehicle body having chassiz frame members, ground wheels attached to the body for supporting the body in movement across the ground, an engine mounted in the body adjacent the front end thereof, transmission means for communicating drive from the engine to the wheels, a pulley mounted on the forward end of the engine for communicating drive by at least one belt from the crankshaft of the engine to at least one engine accessory, an improvement by the provision of a kit of parts comprising a drive member for connection to said crankshaft at said pulley and including a portion arranged to engage a flexible loop coupling member for communicating drive thereto an axially extending sleeve member for extending into said pulley member interiorly thereof, plate means at right angles to said sleeve member, said plate means including a plurality of opening therein for engagement with bolts holding said pulley member onto said crankshaft and shaped to engage around the periphery thereof an inner surface of the pulley member so as to be centered thereby, said plate member extending inwardly from said sleeve portion, said holes including a plurality of outer holes adjacent the sleeve portion and a central hole, said outer holes being sized just to receive shank of one of a plurality of bolts holding said pulley member onto said crankshank and said central hole being of an increased diameter such that it can surround a head of a central one of said bolts, and washer means having a central opening to receive a shank of said central bolt and arranged to engage said plate member around said central hole.

The above drive member is particularly designed to drive the power take-off shaft but could also be used to drive other equipment.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
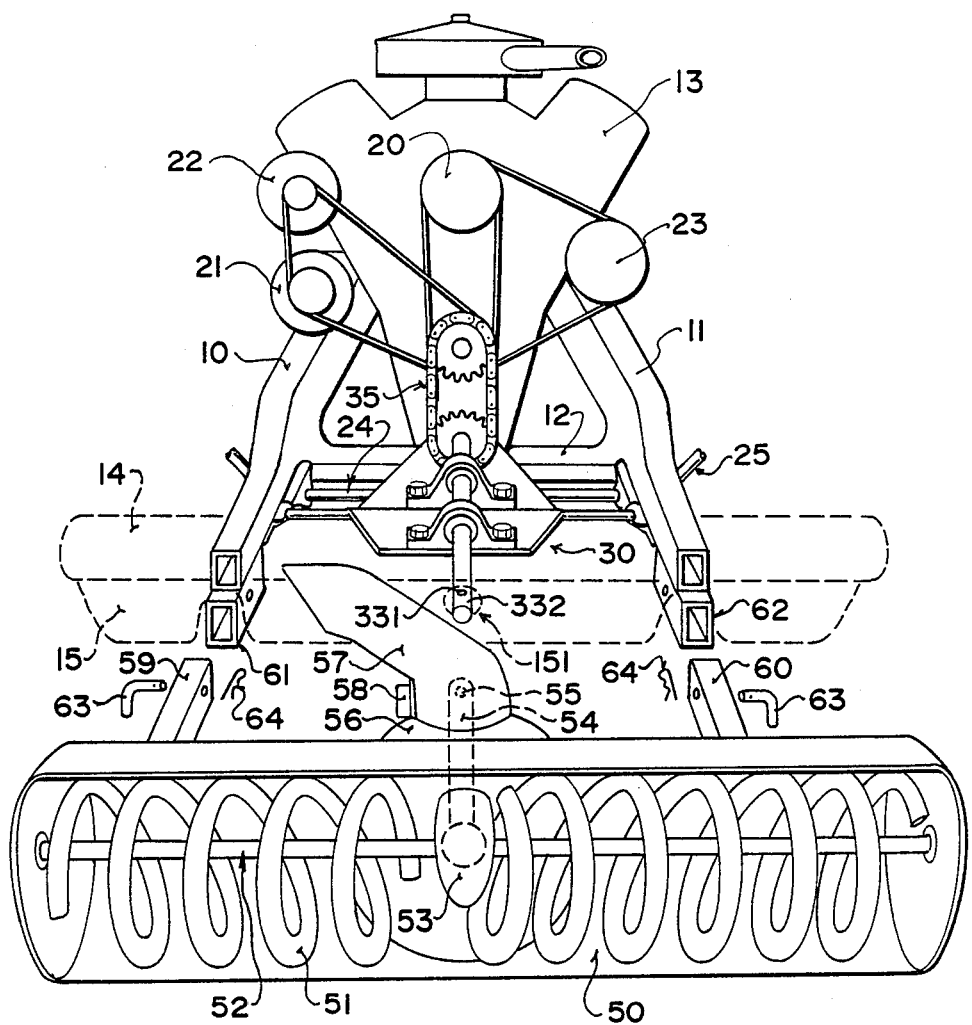
FIG. 1 is a perspective view from a front aspect of a frame and part of the body of a vehicle incorporating a kit of parts and attached snowblower according to the invention.
Figure 2:
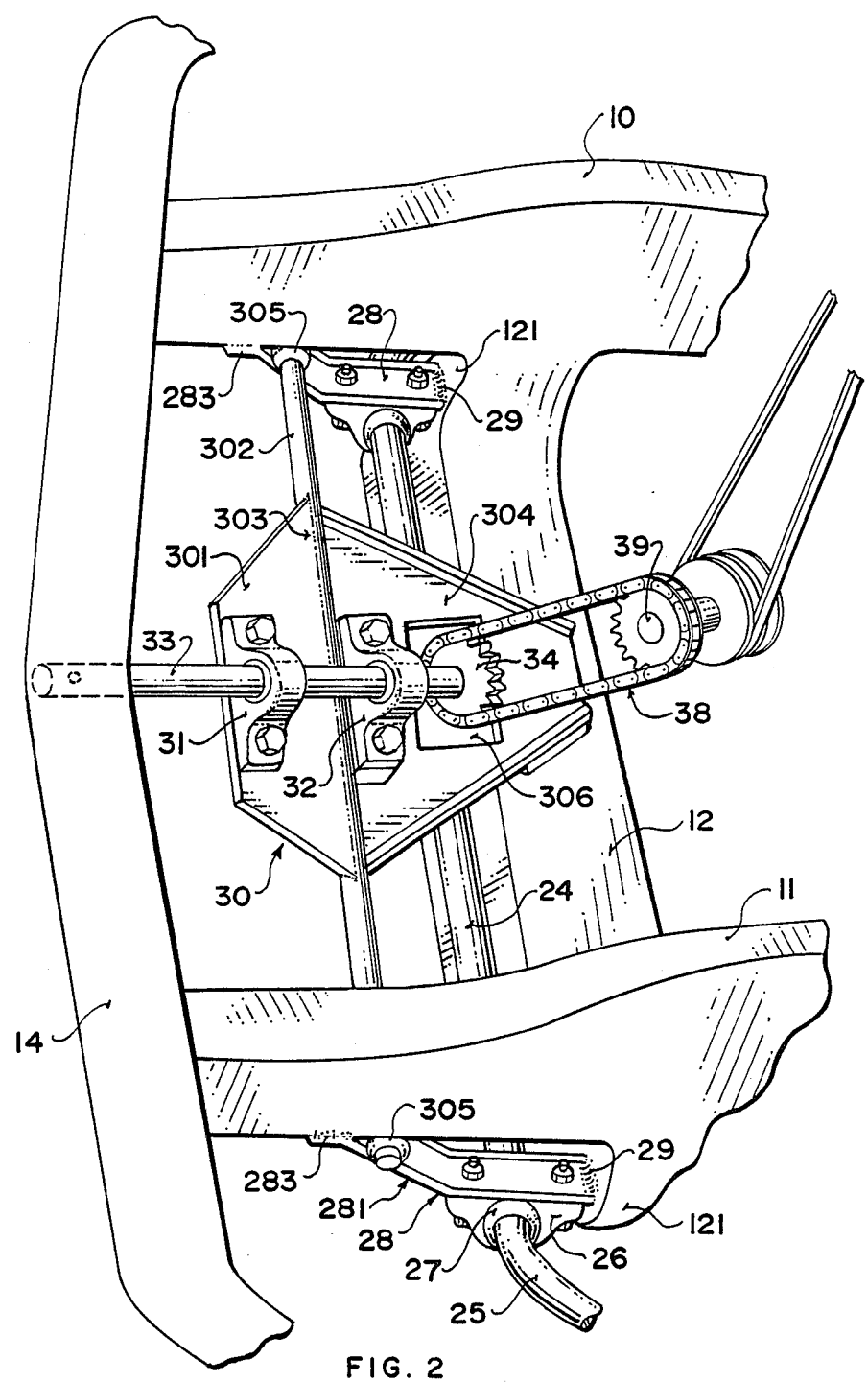
FIG. 2 is a perspective view from above and partly to one side of the apparatus of FIG. 1.

In FIGS. 1 and 2 many parts of the body of the vehicle are broken away so as to expose particularly the invention and its relation to the vehicle body and engine. Thus for convenience the vehicle body is shown as comprising only a pair of longitudinal frame members 10 and 11 together with a transverse frame member or beam 12 which interconnects the members 10 and 11 at a position adjacent to and slightly forward of the engine block schematically indicated at 13. The vehicle also includes a bumper 14 and a front resilient panel 15 beneath the bumper all of which are of conventional construction. The remaining parts of the body, ground wheels, passenger compartment and goods compartment are omitted for convenience of illustration.

The engine block 13 includes a crank shaft 16 (FIG. 3) which has at a forward end a harmonic balancer 17 of conventional construction. Attached to the harmonic balancer and to the crank shaft 16 is a pulley 18. The pulley 18 is defined by an outer annular body defining a plurality of grooves 19 surrounding the body each for receiving a belt from one of the various engine accessories for example a fan 20, an alternator 21, an air conditioning compressor 22 and another accessory indicated at 23 which may be a transmission cooler or water pump or the like.

The annular body 18 of the pulley is connected to an end plate 21 which is bolted to the harmonic balancer 17 by bolts 22. In addition a central crank shaft bolt 23 extends through the plate into the crank shaft 16.

As best shown in FIG. 2, the vehicle suspension includes a torsion or stabilizer bar 24 which extends across the vehicle in front of the transverse beam 12 and includes downwardly and rearwardly turned ends 25. The stabilizer bar 24 is mounted at each of the longitudinal frame members 10 and 11 in a receiving block 26 which includes a rubber mount 27. The block 26 is bolted to a bracket 28 which in turn is welded as indicated at 29 to a downwardly extending portion 121 of the transverse beam 12. A forward end of the bracket 28 extends upwardly and forwardly as indicated at 281 so as to converge toward the respective longitudinal frame member and is welded thereto at a flange 283.

All of the above items are conventional and can be found on vehicles manufactured for example by General Motors.

Figure 3:
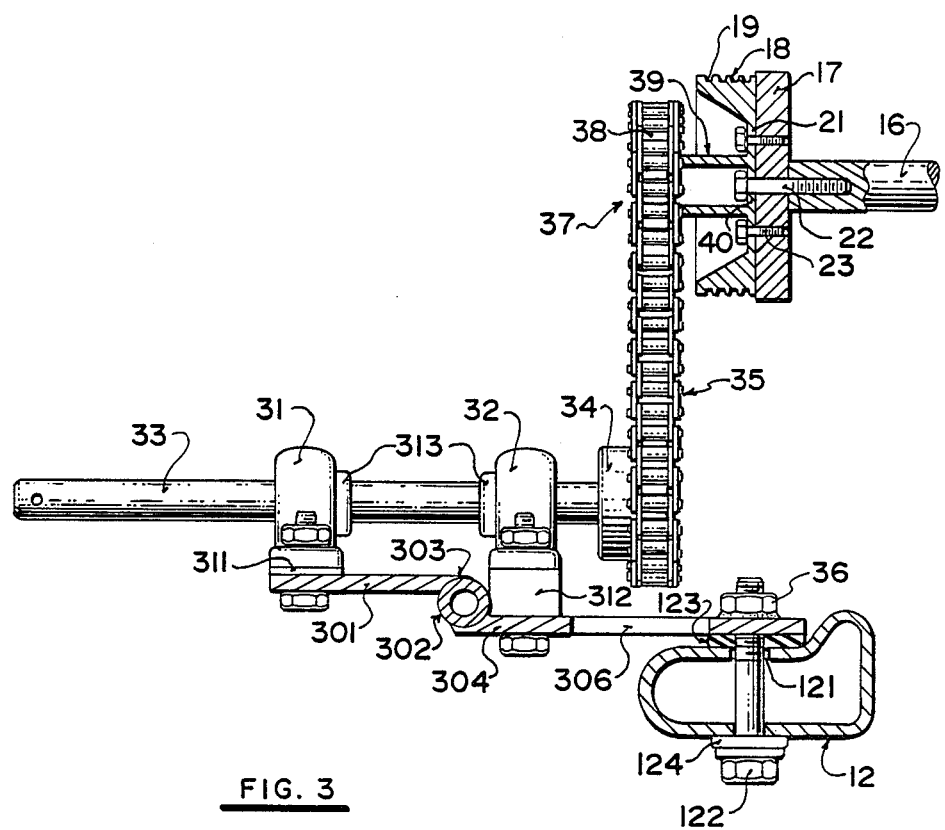
FIG. 3 is a side elevational view of the embodiment of FIGS. 1 and 2.

A kit of parts for attachment to a vehicle of this type is shown in FIGS. 1, 2 and 3 and comprises a base plate member 30 which carries a pair of bearings 31 and 32 mounted thereon and arranged to receive a shaft 33 which passes through the bearings generally parallel to the base plate 30.

The base plate 30 includes a forward portion 301 and a rod 302 which is welded to the forward portion 301 along a rearmost edge thereof as indicated at 303. A rear portion of the plate member is indicated at 304 and is welded to the rod at a forward end thereof on an underside of the rod so that the portions 301 and 304 are vertically spaced by approximately the thickness of the rod 302.

The bearing blocks 31 and 32 are identical and each is mounted upon a resilient pad 311, 312 with the pad 312 being thicker than the pad 311 by a distance substantially equal to the thickness of the rod 302 so that the bearing blocks 31 and 32 are mounted at substantially the same height. The bearing blocks can preferably be of the type which includes a collar 313 which is eccentric and can be rotated to clamp the bearing onto the shaft 33 thus holding the shaft against axial movement.

On a rear end of the shaft is mounted a sprocket 34 for co-rotation with the shaft 33 and for cooperation with a chain 35 which is wrapped around the sprocket 34. An opening 36 in the rear portion 304 allows the chain to be applied to and removed from the sprocket 34.

As best shown in FIG. 2, the forward portion 301 has a forward edge adjacent the forwardmost edge of the bearing block 31 and from that forward edge diverges outwardly toward the rod 302 and particularly its connection therewith. The rear portion 304 commences at the rod at a width substantially equal to the adjacent edge of the portion 301 and from that point converges toward a rearmost edge rearwardly of the sprocket 34 by which is located a nut 36 which is welded to the rear portion 304 of the plate member.

The shape of the plate member allows it to be positioned above the conventional protective plate which underlies the engine so that it is covered thereby.

The rod 302 carries on each end a sleeve 305 which is formed of a resilient material and which closely surrounds the rod 302.

A drive member for the chain 35 is indicated at 37 and includes a sprocket 38 which is welded to a sleeve member 39 which extends from one side of the sprocket inwardly into the interior of the pulley 18. At the inner end of the sleeve 39 is mounted a plate 40 which has a diameter greater than the sleeve 39. The plate 40 has a central opening for receiving the crank shaft bolt 23 so the plate can be bolted to the crank shaft. Immediately outside the sleeve 39 the plate 40 includes a plurality of holes of a size so that they can receive loosely the heads of the bolts 22 attaching the pulley 18 to the balancer 17. The outer edge of the plate 40 is shaped so that it is received as a press fit within the converging inner surface of the annular portion of the pulley 18. Thus the drive member 37 can be inserted into the interior of the pulley until the openings in the plate engage over the exposed heads of the bolts 22. With the bolt 23 previously removed, the bolt can then be re-inserted into the sleeve 39 to be engaged into the end of the crank shaft to bolt the plate 40 into place against the inner face of the pulley 18. The bolt 23 thus holds the drive member 37 in place and the heads of the bolts 22 act to provide a driving force to the drive member 37 so that it follows the rotation of the crank shaft 16.

The power takeoff device according to the invention can thus be attached into the vehicle very simply initially by inserting the rod 302 into its location within the V-shape defined by the brackets 28. The sleeves 305 are of a length so that they cooperate with the bracket so that the bracket is only contacted by the resilient sleeves. With the rod in place, the nut 36 sits directly over a vertical opening 121 which is present in the central beam 12. A bolt 122 can then be passed through the opening 121 to engage the nut 36. A resilient pad 123 is positioned between the underside of the plate portion 304 and the upper surface of the beam 12 and a lower pad 124 is positioned between the head of the bolt 122 and the undersurface of the beam 12.

When the bolt 122 first engages the nut 36, the plate member 30 is pivoted in an anti-clockwise direction from its position in FIG. 3 about an axis longitudinal of the rod 302 with pivotal movement of the plate member being accommodated by rotation of the sleeve 305 relative to the V-shaped area defined between the bracket 28 and the underside of the frame member 10, 11. In this position, the sprocket 34 is raised thus enabling the chain 35 to be slipped into position over the drive member 37 and over the sprocket 34. Rotation of the bolt 122 then acts to draw the plate member downwardly toward the beam 12 thus compressing the pad 123. This adjustment can be carried out until the shaft 33 is parallel to the crank shaft 16 and hence the chain 35 can properly run in aligned motion on the drive member 37 and the sprocket 34.

A forward end of the shaft 33 projects beneath the bumper 14 through an opening 151 in the front sheet 15. Thus the forward end is available for a drive coupling of an implement.

An implement is shown in FIG. 1 in the form of a snowblower which includes a casing 50 as an auger 51 rotatable in that casing on a shaft 52. The shaft 52 is driven by a gear box schematically indicated at 53 from a shaft shown at 54. The shaft 54 includes a sleeve portion which can pass directly over the outer end of the shaft 33 so that a shear pin can be passed through aligned holes 55 and 331 for connecting drive from the shaft 33 to the shaft 54. A fan (not shown) mounted with a casing 56 can also be driven by the shaft 54 so as to act as a two-stage blower for snow carried inwardly by the auger 51 and expelled through a rotatable duct 57. The duct can be driven by a motor schematically indicated at 58 controlled from the interior of the vehicle so that the direction of exit of the blown snow can be controlled. The casing 50 of the snowblower includes a pair of rearwardly extending struts 59 and 60. The position of the casing is arranged such that with the struts extending horizontally rearwardly, the blower can be attached to the front of the vehicle slightly spaced from the ground. A suitable adjustment mechanism between the struts 59 and 60 and the rear of the casing can be provided to adjust the height of the blower if required.

The attachment of the blower to the vehicle is provided by a pair of bracket members 61 and 62 which are bolted to the underside of the forwardmost end of the frame members 10 and 11. The bracket members 61 and 62 define sleeves with their forwardly facing open end for receiving the struts 59 and 60. Thus the respective struts can slide into the sleeve and then be locked in place by a respective pin 63 and lock pin 64.

Figure 4:
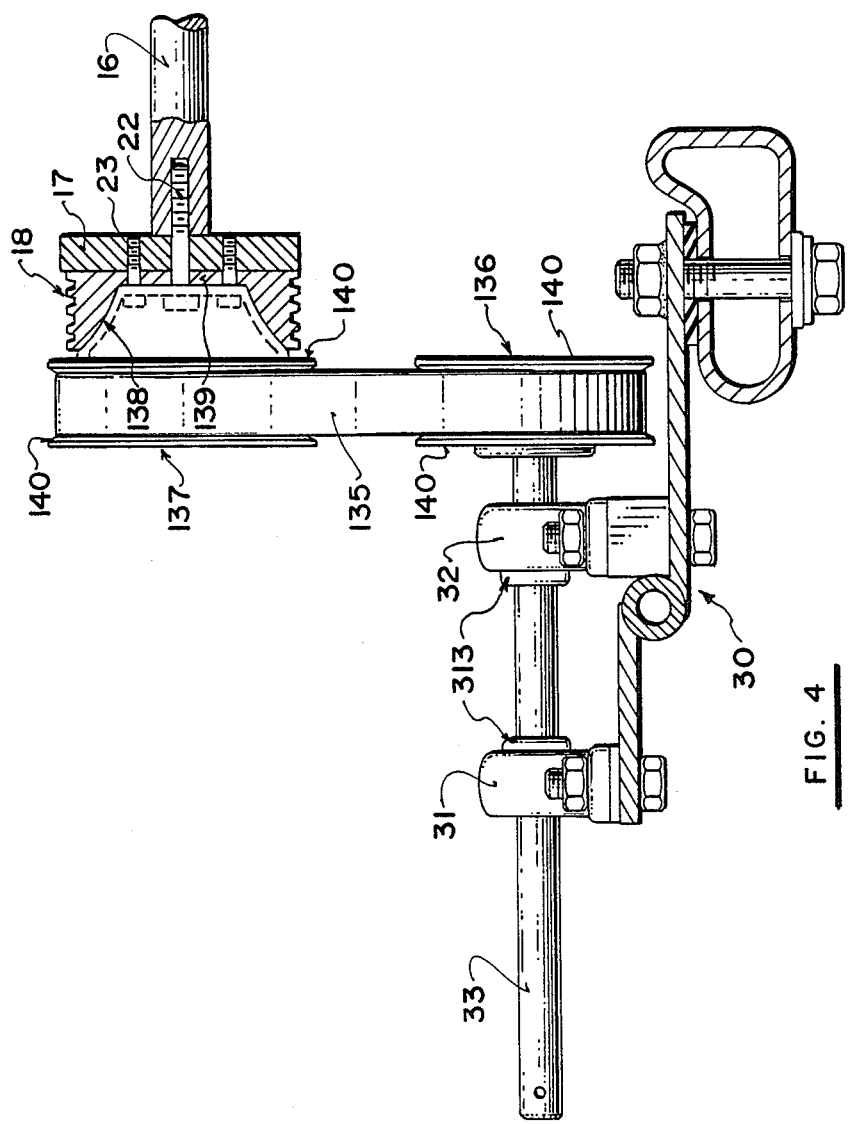
FIG. 4 is a side elevational view similar to FIG. 3 of a modified embodiment.

FIG. 4 is very similar to FIG. 3 and shows substantially the same construction of the plate member 30 including the bearing blocks 31 and 32 and the shaft 33. In this case the chain 35 is replaced by a toothed belt 135 which cooperates with toothed pulleys 136 and 137. The pulley 136 is directly coupled to the shaft 33 as previously described. The pulley 137 acts as the driving member and is connected via a cone-shaped portion 138 to the interior of the pulley 18.

In FIG. 4 the attachment of the pulley 137 to the cam shaft is shown only schematically.

Figure 6:
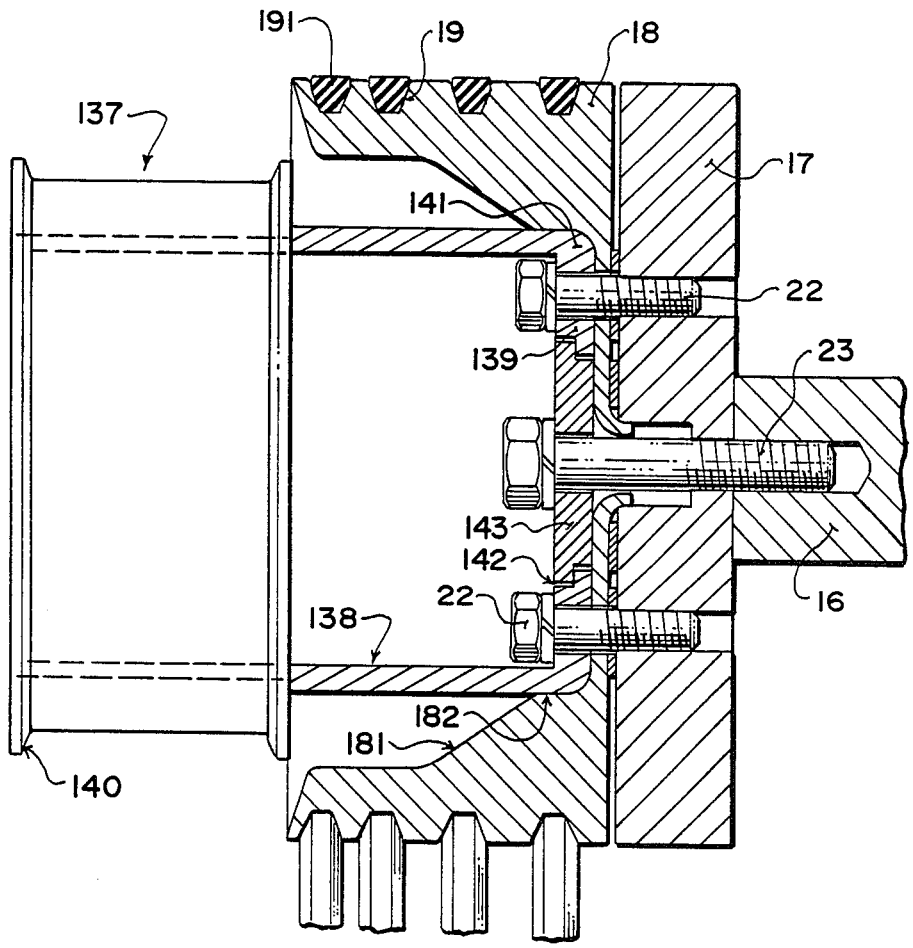
FIG. 6 is a cross-sectional view similar to FIG. 4 showing a modified construction of drive member for mounting on the crankshaft pulley.

In FIG. 6 the construction is shown in more detail where the crankshaft 16 is attached to or carries the harmonic balancer 17. The pulley 18 which includes channels 19 for the belts 191 is attached to the crankshaft 16 and to the harmonic balancer 17 by bolts 22 and by a central bolt 23. The bolts 22 are arranged around the periphery and generally there are four such bolts.

The pulley 137 includes a sleeve member 138 which carries the pulley and extends axially toward the end face of the pulley 18. It will be noted that the inner surface of the pulley 18 converges inwardly at a wall 181 and then extends again axially at a portion indicated at 182 which would normally receive the heads of the bolts 22. Thus the sleeve 138 is arranged to be of an outside diameter so that it is just received within the recess area 182 as a press fit thus acting to center the sleeve 138 around the axis of the crankshaft.

An end face turned inwardly from the sleeve 138 is indicated at 139 and includes four outer holes 141 and a central hole 142. The outer holes 141 are arranged to be a close fit surrounding the shank of the bolts 22 so that the head of the bolts clamps against the outer surface of the end face 139. The central hole 142 is arranged to be significantly greater than the outer diameter of the head of the bolt 23. In this way in an initial assembly of the device, the outer bolts 22 can be removed from the pulley 18 and harmonic balance of 17 leaving the central bolt 23 still attached. The sleeve 138 can then be pressed into position so the end face engages the end face of the pulley 18 with the central hole 142 receiving the head of the bolt 23. The holes 141 can then be aligned with the openings for the bolts 22 and the bolts 22 replaced. In practice the bolt 22 will normally have a hex nut head which would be of too large a size to be received inside the inner surface of the sleeve 138 and therefore the bolts 22 are replaced by Allen screws.

With the end face 139 thus clamped into position by the bolts 22, the bolt 23 can be removed and a washer 143 applied to the head of the bolt so that the washer is clamped by the head into the opening 142 as the bolt 23 is replaced into its position in the crankshaft 16.

In this way the pulley 18 and the harmonic balancer 17 are always retained in their required position by either the outer bolts 22 or the central bolt 23 and at no time are all of the bolts removed. There is no requirement therefore to release and retension the belts 191 and no readjustment of any of the parts is required. It should be noted that the washer 143 includes a stepped outer surface for co-operation with the corresponding shape in the end plate 139 so the washer is properly centered.

In this case the cone-shaped portion 138 closely follows the inner confines of the pulley 18 so as to be centered thereby and includes an end face 139 which can be clamped against the plate of the pulley 18 by the bolts 22 and 23. The use of the timing belt type drive enables the device to run more quietly and also enables the belt to be applied and removed more readily since it requires less pivotal movement of the plate 30 about the rod 302. End flanges 140 are provided on either side of the pulleys 136 and 137 so as to retain the belt on the pulleys and to prevent it walking in either direction due to any slight misalignment between the pulleys.

Figure 5:
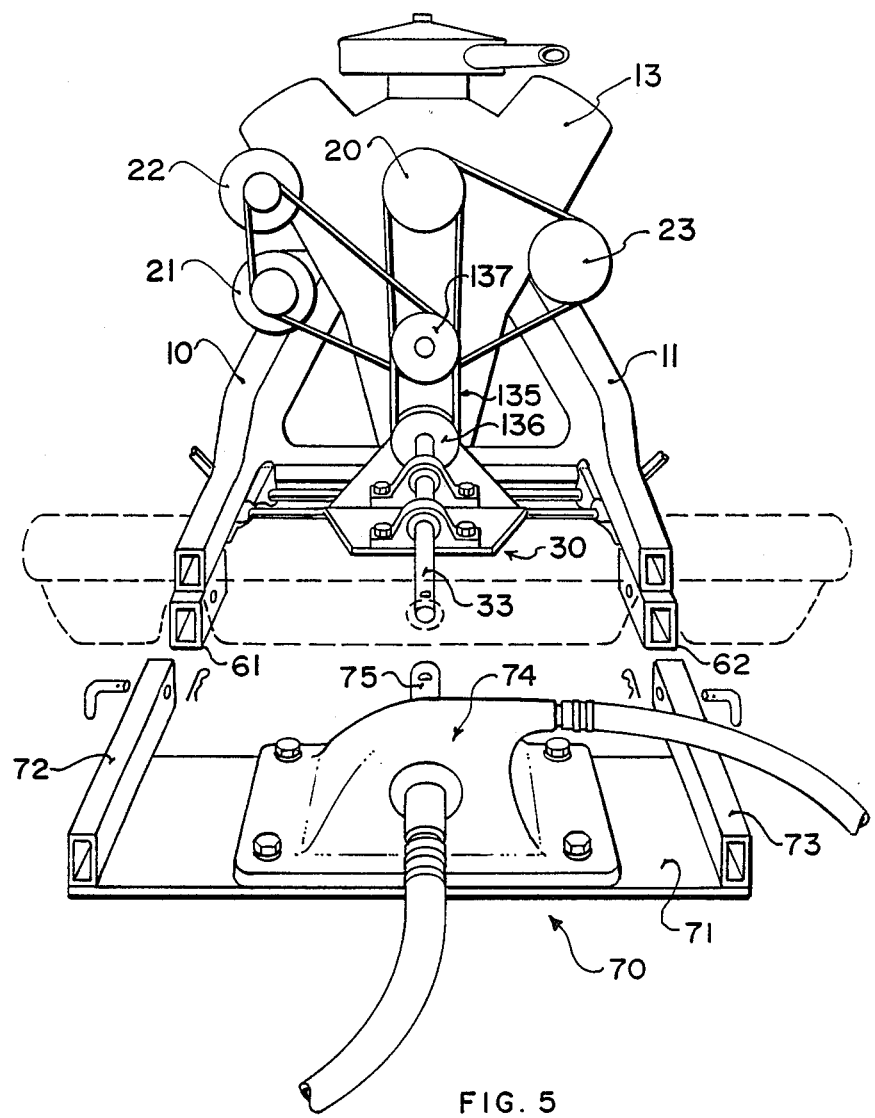
FIG. 5 is a perspective view similar to that of FIG. 1 showing the modified embodiment of FIG. 4 and a different implement attached to the vehicle.

The belt-type arrangement is shown also in FIG. 5. FIG. 5 also shows the snowblower removed and replaced by a pump implement generally indicated at 70. The pump implement comprises a base plate 71 and struts 72 and 73 which cooperate with the brackets 61 and 62 as previously described. Upon the base plate 71 is mounted a pump 74 which is driven by a shaft 75 connected to the shaft 33 by a shear pin. Thus the power from the engine can be used to directly drive the pump 74.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. In a motor vehicle of the type including a vehicle body having chassis frame members, road wheels attached to the body for supporting the body in movement along a road, an engine mounted in the body adjacent a front end thereof, transmission means for communicating drive from the engine to the wheels, a bumper across said front end of the body, a plurality of engine accessories including an electrical generator and a pulley mounted on a forward end of the engine for communicating drive via at least one belt from a crank shaft of the engine to said engine accessories, an improvement by the provision of a kit of parts comprising a base member having means thereon for releasable attachment of the base member, power takeoff shaft means carried in said bearing means and arranged relative to said base member so as to extend, with the base member attached to the frame members, parallel to and beneath the crank shaft and arranged such that a forward end thereof extends to an accessible position at said front of the vehicle body beneath said bumper, releasable coupling means on said shaft means at said forward end thereof and drive coupling means for communicating drive from the crank shaft to the power takeoff shaft means including a flexible loop coupling member, a first drive member attached to the crank shaft at the pulley for driving the coupling member and a second drive member mounted on the power takeoff shaft for communicating drive from the coupling member to the shaft and a pair of bracket members each attached to respective one of said frame members at said front end of said body for removably mounting at said front end an implement for driving by said shaft means.

2. The invention according to claim 1 wherein the base member includes an elongate rod member extending out at respective sides thereof in a direction generally at right angles to the shaft means, said rod member being cylindrical in cross-section at ends thereof adjacent the frame to engage the frame in a manner which allows pivotal movement of said base member about an axis longitudinal of said strut means, wherein said base member about an axis longitudinal of said strut means, wherein said base member includes a portion thereof for engaging against a cross member of the frame and means cooperating between said cross member and said base member for adjusting the angle of the base member about said pivot axis, wherein said vehicle includes a torsion stabilizer bar member which extends transversely to a longitudinal direction of the vehicle and is connected to longitudinal frame members on opposed sides of a center line of the vehicle by connecting means, said connecting means being rigidly coupled to a respective one of said frame members so as to define a V-shaped space therebetween, said rod member being arranged for seating in said V-shaped space, wherein said second drive member is mounted on said base member at a position spaced from said pivot axis so that pivotal movement of said base member about said pivot axis adjust the spacing between said second drive member and said first drive member, and wherein said cooperating means comprises a bolt arranged to pass through an opening in said transverse frame member and having a screw thread thereon for engaging a nut provided on said base member and resilient spacing means arranged between said base member and said frame member whereby rotation of said bolt causes variable compression of said resilient spacing member to adjust said base member around said pivot axis.

3. The invention according to claim 2 wherein said kit of parts includes a pair of sleeve members each arranged for bolting to a respective one of said frame members at the front end thereof on an underside thereof so as to expose an open end of said sleeve member for receipt of a shaft of an implement to be attached at said front end.

4. The invention according to claim 2 wherein said plate member comprises a first base portion on one side of said rod member and a second plate portion on an opposed side of said rod member, said second portion lying in a plane spaced from that of the first by the thickness of the rod member.

5. The invention according to claim 4 including a first and a second bearing block each mounted on respective one of said plate portions and each spaced from the respective plate portions by a resilient pad member, the height of one pad member being greater than that of the other whereby the shaft supported in said bearings lies parallel to said plate portions.

6. The invention according to claim 1 wherein said first drive member comprises a portion arranged to engage said flexible loop coupling member and including means thereon for preventing axial movement of said flexible coupling member, an axially extending sleeve member for extending into said pulley member interiorly thereof and plate means at right angles to said sleeve portion, said plate means including a plurality of openings therein for engagement with bolts holding said pulley member onto said crank shaft.

7. The invention according to claim 6 wherein said plate means extends outwardly from said sleeve portion and includes a plurality of holes therein for loosely engaging over heads of the pulley bolts and wherein said plate means includes a central opening clamped to said pulley by said crank shaft bolt.

8. The invention according to claim 6 wherein said plate means extends inwardly from said sleeve portion and includes a plurality of holes therein arranged such that said plate means is bolted by bolts passing through said holes.

9. The invention according to claim 1 wherein said kit of parts includes a pair of sleeve members each arranged for bolting to a respective one of said frame members at the front end thereof on an underside thereof so as to expose an open end of said sleeve member for receipt of a shaft of an implement to be attached at said front end.

10. The invention according to claim 9 wherein said kit of parts includes a pair of sleeve members each arranged for bolting to a respective one of said frame members at the front end thereof on an underside thereof so as to expose an open end of said sleeve member for receipt of a shaft of an implement to be attached at said front end including an implement having a first and a second strut member extending rearwardly therefrom and slideable into a respective one of said sleeve members such that the implement is supported rigidly at a front end of the vehicle.

11. The invention according to claim 10 wherein said implement comprises a snowblower.

12. The invention according to claim 1 wherein said firm drive member includes an axially extending sleeve member for extending into said pulley member interiorally thereof, plate means at right angles to said sleeve member, said plate means including a plurality of opening therein for engagement with bolts holding said pulley member onto said crankshaft and shaped to engage around the periphery thereof an inner surface of the pulley member so as to be centered thereby, said plate means extending inwardly from said sleeve portion, said holes including a plurality of outer holes adjacent the sleeve portion and a central hole, said outer holes being sized just to receive the shank of one of a plurality of bolts holding said pulley member onto said crankshank and said central hole being of an increased diameter such that it can surround a head of a central one of said bolts, and washer means having a central opening to receive a shank of said central bolt and arranged to engage said plate means around said central hole.

13. In a motor vehicle of the type including a vehicle body having chassis frame members, road wheels attached to the body for supporting the body in movement along a road an engine mounted in the body adjacent a front end thereof, transmission means for communicating drive from the engine to the wheels, a bumper across said front end of the body, a plurality of engine accessories including an electrical generator and a pulley mounted on a forward end of the engine for communicating drive via at least one belt from a crank shaft of the engine to said engine accessories, an improvement by the provision of a kit of parts comprising a base member having means thereon for releasable attachment of the base member to the frame members of the vehicle body, bearing means mounted on the base member, power takeoff shaft means carried in said bearing means and arranged relative to said base member so as to extend, with the base member attached to the frame members, parallel to and beneath the crank shaft and arranged such that a forward end thereof extends to an accessible position at said front of the vehicle body beneath said bumper, releasable coupling means on said shaft means at said forward end thereof and drive coupling means for communicating drive from the crank shaft to the power takeoff shaft means including a flexible loop coupling member, a first drive member attached to the crank shaft at the pulley for driving the couplingmember and a second drive member mounted on the power takeoff shaft for communicating drive from the coupling member to the shaft and a pair of bracket members each attached to a respective one of said frame members of said front end of said body for unmovably mounting at said front end an implement for driving by said shaft means wherein the base member includes elongate strut means extending out at respective sides thereof in a direction generally at right angles to the shaft means, said strut means being arranged to engage the frame in a manner which allows pivotal movement of said base member about an axis longitudinal of said strut means and wherein said vehicle includes a torsion stabilizer bar member which extends transversely to a longitudinal direction of the vehicle and is connected to longitudinal frame members on opposed sides of a center line of the vehicle by connecting means, said connecting means being rigidly coupled to a respective one of said frame members so as to define a V-shaped space therebetween, said strut means being arranged for seating in said V-shaped space, said plate member including means for cooperating with a transverse frame member interconnecting said longitudinal frame members.

14. The invention according to claim 13 wherein said base member includes a portion thereof for engaging against a cross member of the frame and means cooperating between said cross member and said base member for adjusting the angle of the plate member about said pivot axis.

15. The invention according to claim 14 wherein said cooperating means comprises a bolt arranged to pass through an opening in said transverse frame member and having a screw thread thereon for engaging a nut provided on said base member and resilient spacing means arranged between said base member and said frame member whereby rotation of said bolt causes variable compression of said resilient spacing member to adjust said base member around said pivot axis.

16. The invention according to claim 13 wherein said strut means are constituted by a rod member extending transversely to the plate member, said rod member being cylindrical in cross section at ends thereof adjacent said frame.

17. The invention according to claim 2 wherein said strut means include resilient sleeve members thereon for contacting said frame members.

18. The invention according to claim 13 wherein said second drive member is mounted on said base member at a position spaced from said pivot axis so that pivotal movement of said base member about said pivot axis adjusts the spacing between said second drive member and said first drive member.

19. In a motor vehicle of the type including a vehicle body having chassis frame members, ground wheels attached to the body for supporting the body in movement across the ground, an engine mounted in the body adjacent the front end thereof, transmission means for communicating drive from the engine to the wheels, a pulley mounted on the forward end of the engine for communicating drive by at least one belt from the crankshaft of the engine to at least one engine accessory, an improvement by the provision of a kit of parts comprising a drive member for connection to said crankshaft at said pulley and including a portion arranged to engage a flexible loop coupling member for communicating drive thereto an axially extending sleeve member for extending into said pulley member interiorally thereof, plate means at right angles to said sleeve member, said plate means including a plurality of openings therein for engagement with bolts holding said pulley member onto said crankshaft and shaped to engage around the periphery thereof an inner surface of the pulley means so as to be centered thereby, said plate means extending inwardly from said sleeve portion, said holes includign a plurality of outer holes adjacent the sleeve portion and a central hole, said outer holes being sized just to receive the shank of one of a plurality of bolts holding said pulley member onto said crankshank and said central hole being of an increased diameter such that it can surround a head of a central one of said bolts, and washer means having a central opening to receive a shank of said central bolt and arranged to engage said plate means around said central hole.

* * * * *